United States Patent
Liu (10) Patent No.: US 11,109,189 B2
(45) Date of Patent: Aug. 31, 2021

(54) SYSTEM AND METHOD FOR RETRIEVING LOST ELECTRONIC DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Cheng-Xiang Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 718 days.

(21) Appl. No.: 15/959,046

(22) Filed: Apr. 20, 2018

(65) Prior Publication Data

US 2019/0208364 A1   Jul. 4, 2019

(30) Foreign Application Priority Data

Dec. 28, 2017 (CN) .......................... 201711465839.2

(51) Int. Cl.
  *G06F 21/88* (2013.01)
  *H04W 4/029* (2018.01)
  *H04W 88/02* (2009.01)
  *H04W 4/60* (2018.01)

(52) U.S. Cl.
  CPC ............ *H04W 4/029* (2018.02); *G06F 21/88* (2013.01); *H04W 88/02* (2013.01); *H04W 4/60* (2018.02)

(58) Field of Classification Search
  CPC ...... G06F 21/88; G06F 21/305; H04W 12/40; H04W 12/63; H04W 4/029; H04W 4/12; H04W 4/60; H04W 88/02; H04M 1/67
  See application file for complete search history.

(56) References Cited

U.S. PATENT DOCUMENTS

| | | | |
|---|---|---|---|
| 2003/0074577 A1* | 4/2003 | Bean ....................... | G06F 21/88 726/35 |
| 2003/0087627 A1* | 5/2003 | Cannon .................... | H04M 1/67 455/404.1 |
| 2004/0203601 A1* | 10/2004 | Morriss ................. | H04M 1/677 455/411 |

(Continued)

OTHER PUBLICATIONS

Microsoft Computer Dictionary, 2002, Microsoft, Fifth Edition, p. 481.*

*Primary Examiner* — Minh Dinh
(74) *Attorney, Agent, or Firm* — ScienBiziP, P.C.

(57) ABSTRACT

An electronic device includes a display screen, a communication unit, a processor, and a storage. The display screen displays a lost-and-found interface when the display screen is in a lock-screen state. Personal information input by the finder into the lost-and-found interface and identification information of the electronic device are obtained. The personal information input by the finder and the identification information of the electronic device are sent to a lost-and-found tracking device in communication with the electronic device. The lost-and-found tracking device obtains personal information of an owner of the electronic device according to the identification information of the electronic device and determines a method for returning the electronic device to the owner according to the personal information of the finder and the personal information of the owner.

10 Claims, 8 Drawing Sheets

Receiving personal information of a finder of an electronic device and identification information of the electronic device — 701

Obtaining personal information of an owner of the electronic device — 702

Determining a method for returning the electronic device according to the personal information of the owner and the personal information of the finder — 703

(56) References Cited

U.S. PATENT DOCUMENTS

| | | | |
|---|---|---|---|
| 2005/0285731 A1* | 12/2005 | Outlaw | H04W 8/22 |
| | | | 340/539.1 |
| 2009/0183266 A1* | 7/2009 | Tan | G06F 21/88 |
| | | | 726/35 |
| 2010/0169965 A1* | 7/2010 | Chhabra | G06F 21/88 |
| | | | 726/17 |
| 2014/0148120 A1 | 5/2014 | Buck | |
| 2014/0329460 A1 | 11/2014 | Loutit | |
| 2015/0089674 A1* | 3/2015 | Clapham | G06F 21/00 |
| | | | 726/34 |
| 2015/0294261 A1* | 10/2015 | Adell | G06Q 10/083 |
| | | | 705/330 |
| 2018/0054708 A1* | 2/2018 | Yazdani | H04L 67/18 |
| 2018/0146326 A1* | 5/2018 | Byrd | H04W 4/02 |

\* cited by examiner

SYSTEM AND METHOD FOR RETRIEVING LOST ELECTRONIC DEVICE

CROSS-REFERENCE TO RELATED APPLICATIONS

This application claims priority to Chinese Patent Application No. 201711465839.2 filed on Dec. 28, 2017, the contents of which are incorporated by reference herein.

FIELD

The subject matter herein generally relates to a method for retrieving a lost electronic device.

BACKGROUND

Generally, when an electronic device is lost, there are few ways of recovering the electronic device.

BRIEF DESCRIPTION OF THE DRAWINGS

Implementations of the present disclosure will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
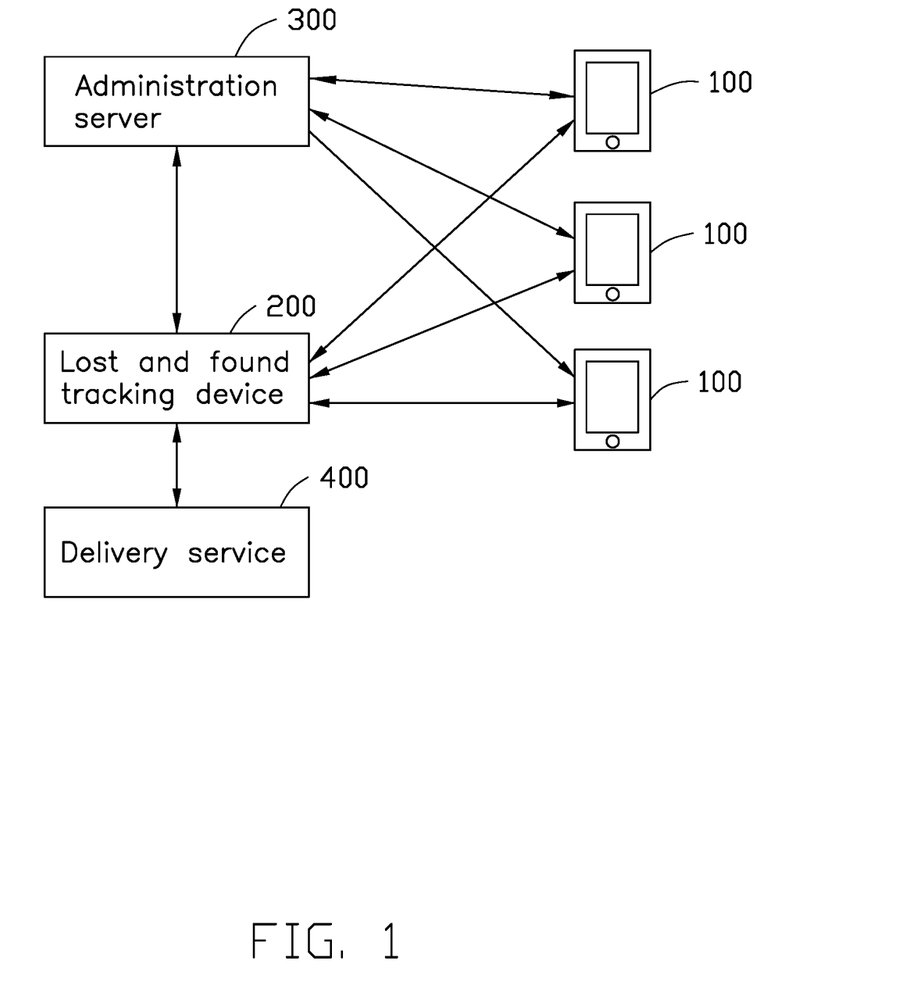
FIG. 1 is a diagram of an exemplary embodiment of a system for retrieving a lost electronic device in accordance with an embodiment of the present disclosure.

FIG. 1 illustrates an embodiment of a lost-and-found tracking device 200 in communication with at least one electronic device 100 and at least one administration server 300. The administration server 300 provides data service for the electronic device 100. The administration server 300 stores personal information of an owner of the electronic device 100. The administration server 300 shares the personal information of the owner of the electronic device with the lost-and-found tracking device 200. When the electronic device 100 is lost, a person who finds the electronic device 100 (hereinafter "the finder") can input personal information of the finder (such as a name, address, contact information, and the like). The electronic device 100 links the personal information of the finder to identification information of the electronic device 100 and sends the personal information of the finder and the identification information of the electronic device 100 to the lost-and-found tracking device 200. The lost-and-found tracking device 200 receives the personal information of the finder and the identification information of the electronic device 100 and obtains personal information of an owner from the administration server 300 according to the identification information. A method for returning the electronic device 100 to the owner is determined according to the personal information of the owner and the personal information of the finder. For example, the electronic device 100 may be sent by a delivery service, or the owner may collect the electronic device 100 directly from the finder.

In at least one embodiment, the lost-and-found tracking device 200 may be a server, a cloud server, or the like for communicating with a plurality of electronic devices 100 and a plurality of administration servers 300. In another embodiment, the lost-and-found tracking device 200 may be installed in the electronic device 100. In another embodiment, the lost-and-found tracking device 200 may be installed in the administration server 300.

In at least one embodiment, the electronic device 100 has installed therein a subscriber identification module (SIM) card. The identification information of the electronic device 100 is installed in an integrated circuit card identity (ICCID) of the SIM card, and a SIM card number and the ICCID are the identification information of the SIM card. Each ICCID is linked to a corresponding phone number. The administration server 300 provides service for the electronic device 100. For example, the administration server 300 may be China Mobile, China Unicom, China Telecom, or other telephone service operator. The administration server 300 may require the personal information of the owner, such as a name of the owner, to establish the SIM card. Information of the personal information of the owner, the ICCID, the phone number, and a location of the administration server 300 may be linked together. Thus, the personal information of the owner may include, but is not limited to, the name of the owner, a contact telephone number, and the location of the administration server 300 where the SIM card was established. The lost-and-found tracking device 200 obtains the personal information of the owner from the administration server 300.

Figure 2:
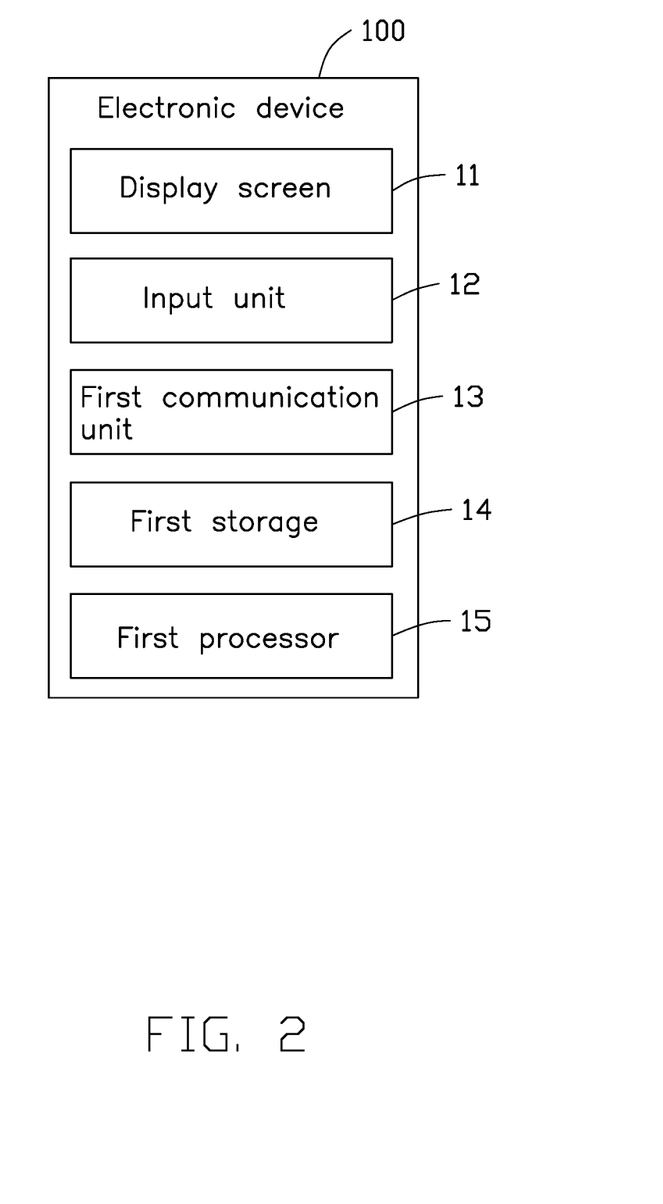
FIG. 2 is a diagram of the electronic device of FIG. 1.

Referring to FIG. 2, the electronic device 100 includes a display screen 11, an input unit 12, a first communication unit 13, a first storage 14, and a first processor 15.

The display screen 11 displays an interface in response to user operations. In at least one embodiment, the display screen is a touch screen.

The input unit 12 is used by a user to input user operations and may be integrated with the display screen 11 or may be an external device, such as a keyboard.

The first communication unit 13 establishes communication with the lost-and-found tracking device 200 and the administration server 300. In at least one embodiment, the first communication unit 13 communicates through a wireless network with the lost-and-found tracking device 200 and the administration server 300. The wireless network may be WIFI, a mobile network, a satellite network, or the like. In at least one embodiment, the first communication unit 13 communicates with the lost-and-found tracking device 200 through WIFI, and communicates with the administration server 300 through a mobile network.

The first storage 14 stores the identification information of the electronic device 100. The first storage 14 can be a read-only memory, a random access memory, a programmable read-only memory, an erasable programmable read-only memory, a one-time programmable read-only memory, an electrically erasable programmable read only memory, a compact disc read-only memory, or an external storage device such as a magnetic disk, a hard disk, a smart media card, a secure digital card, a flash card, or the like. When the lost-and-found tracking device 200 is a server or a cloud server, the first storage 14 stores an Internet address of the server, and the first communication unit 13 communicates with the lost-and-found tracking device 200 through the Internet address.

The first processor 15 can be a central processing unit, a microprocessing unit, or other data processing chip.

Figure 3:
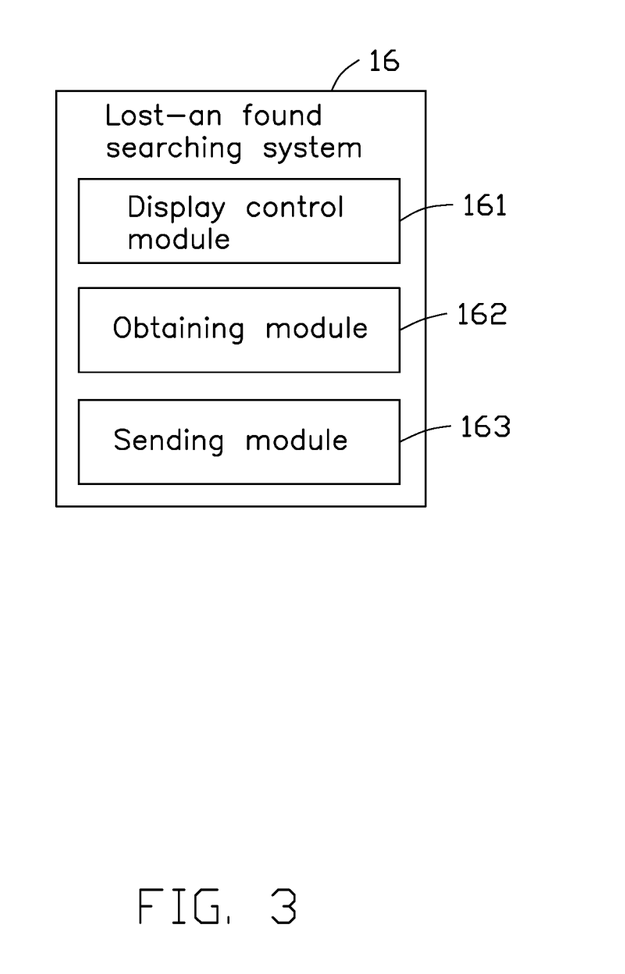
FIG. 3 is a diagram of a lost-and-found searching system implemented in the electronic device of FIG. 2.

Referring to FIG. 3, a lost-and-found searching system 16 includes a plurality of modules stored in the first storage 14 and executed by the first processor 15 to execute functions of the electronic device 100. In at least one embodiment, the lost-and-found searching system 16 includes a display control module 161, an obtaining module 162, and a sending module 163.

Figure 4:
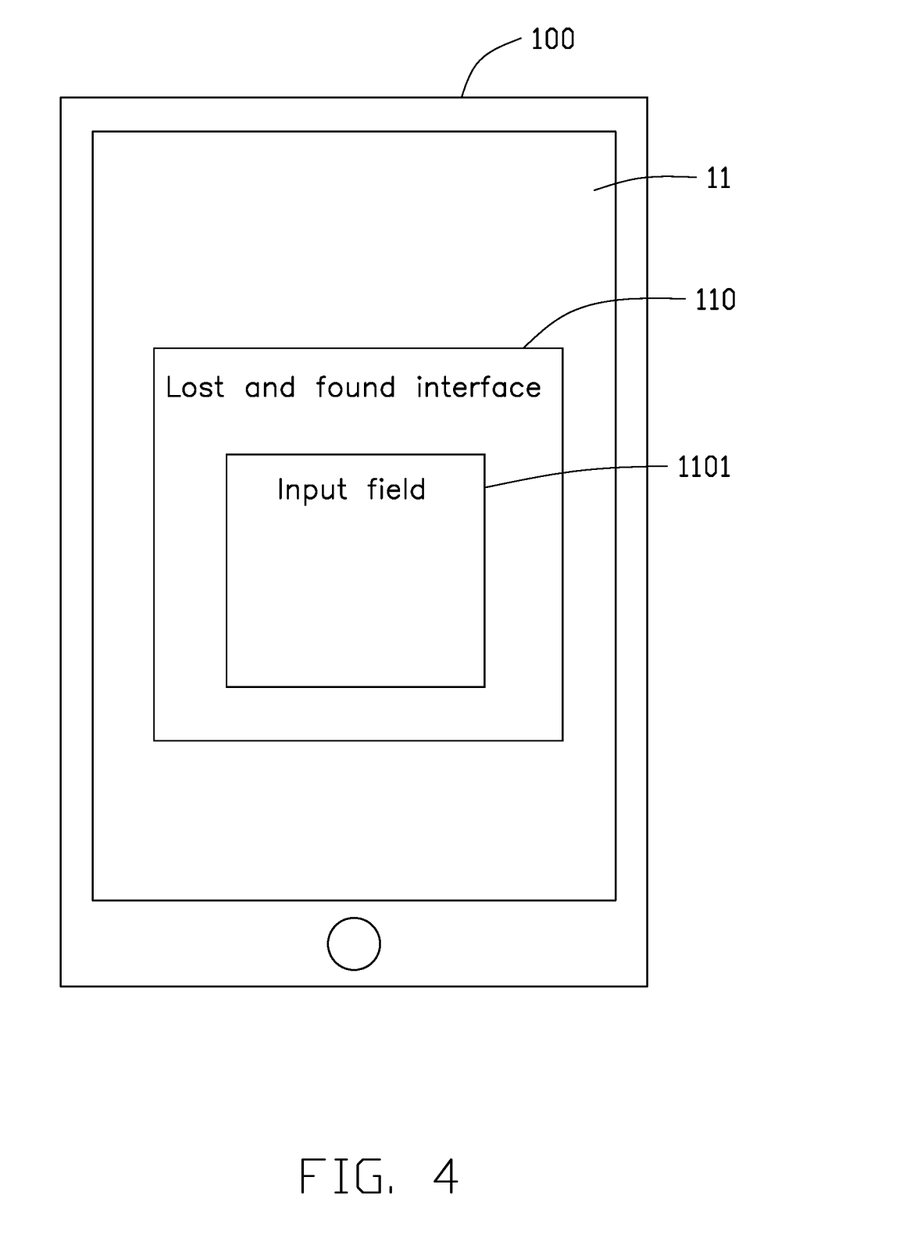
FIG. 4 is a diagram of a lost-and-found interface displayed on a display screen of the electronic device.

The display control module 161 displays a lost-and-found interface 110 on the display screen 11 in response to user operations when the display screen 11 is in a lock-screen state. When the electronic device 100 is lost, the finder inputs the personal information of the finder into the lost-and-found interface 110. The lost-and-found interface 110 may be opened in the lock-screen state. For example, when the electronic device 100 is in the lock-screen state, the display control module 161 may display an icon on the lock-screen. When the icon is pressed, the display control module 161 controls the display screen 11 to display the lost-and-found interface 110. In another example, the lock-screen may include an icon with text saying, "search for the owner", and when the finder presses the icon, the display control module 161 controls the display screen 11 to display the lost-and-found interface 110. Referring to FIG. 4, the lost-and-found interface 110 may include a plurality of input fields 1101 to allow the finder to input a name, telephone number, address, or other personal information. The finder inputs the personal information through the input unit 12.

The obtaining module 162 obtains the personal information of the finder from the lost-and-found interface 110, and further obtains the identification information of the electronic device 100 from the first storage 14.

The sending module 163 sends the personal information of the finder and the identification information of the electronic device 100 to the lost-and-found tracking device 200 through the first communication unit 13.

Figure 5:
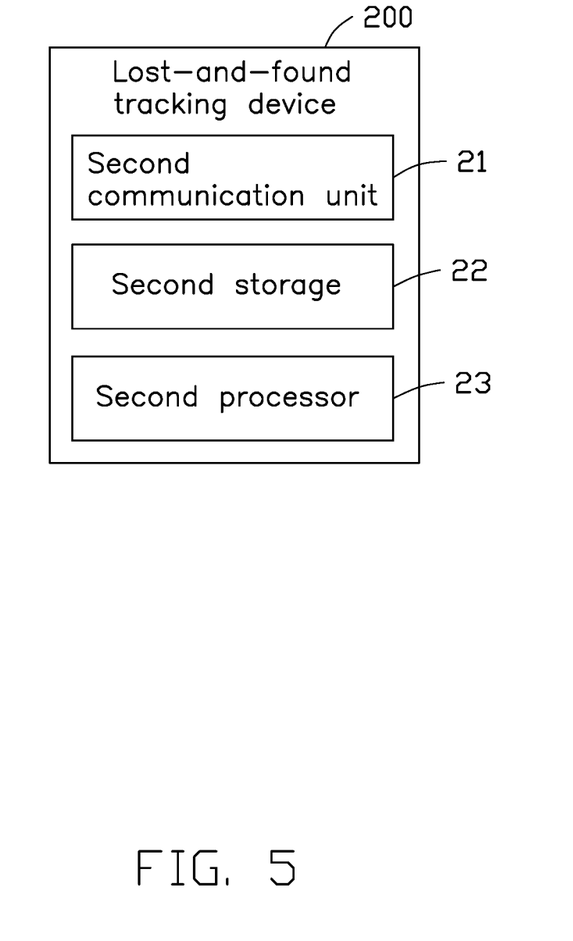
FIG. 5 is a diagram of a lost-and-found tracking device of FIG. 1.

Referring to FIG. 5, the lost-and-found tracking device 200 includes a second communication unit 21, a second storage 22, and a second processor 23.

The second communication unit 21 establishes communication with the electronic device 100 and the administration server 300. In at least one embodiment, the second communication unit 21 communicates through a wireless network with the electronic device 100 and the administration server 300. The wireless network may be WIFI, a mobile network, a satellite network, or the like.

The second storage 22 stores data of the lost-and-found tracking device 200. In at least one embodiment, when the lost-and-found tracking device 200 is a server or a cloud server, the second storage 22 is an internal storage of the lost-and-found tracking device 200. When the lost-and-found tracking device 200 is installed in the electronic device 100 or the administration server 300, the second storage 22 can be an internal storage of the lost-and-found tracking device 200, or can be a storage of the electronic device 100 or the administration server 300. In at least one embodiment, the second storage 22 can be a read-only memory, a random access memory, a programmable read-only memory, an erasable programmable read-only memory, a one-time programmable read-only memory, an electrically erasable programmable read only memory, a compact disc read-only memory, or an external storage device such as a magnetic disk, a hard disk, a smart media card, a secure digital card, a flash card, or the like.

The second processor 23 can be a central processing unit, a microprocessing unit, or other data processing chip. When the lost-and-found tracking device 200 is a server or a cloud server, the second processor 23 is an internal processor of the lost-and-found tracking device 200. In another embodiment, when the lost-and-found tracking device 200 is installed in the electronic device 100 or the administration server 300, the second processor 23 can be an internal storage of the lost-and-found tracking device 200, or can be a processor of the electronic device 100 or the administration server 300.

Figure 6:
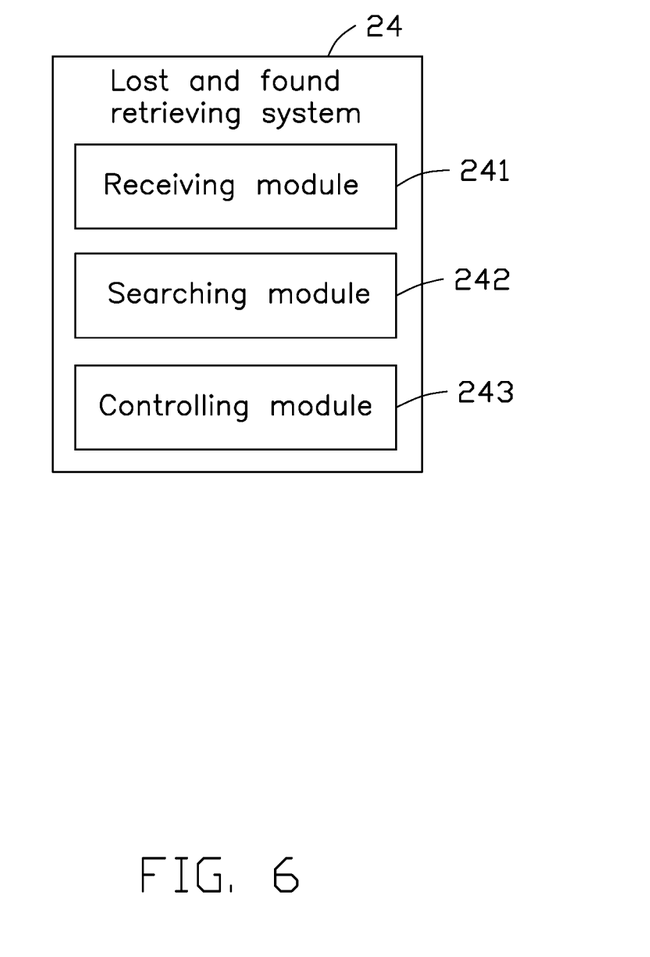
FIG. 6 is a diagram of a lost-and-found retrieving system implemented in the lost-and-found tracking device of FIG. 5.

Referring to FIG. 6, a lost-and-found retrieving system 24 includes a plurality of modules stored in the second storage 22 and executed by the second processor 23 to execute functions of the lost-and-found tracking device 200. In at least one embodiment, the lost-and-found retrieving system 24 includes a receiving module 241, a searching module 242, and a controlling module 243.

The receiving module 241 receives the personal information of the finder and the identification information of the electronic device 100 through the second communication unit 21.

The searching module 242 obtains the personal information of the owner from the administration server 300 according to the identification information of the electronic device 100.

The controlling module 243 determines the method for returning the electronic device 100 to the owner according to the personal information of the owner and the personal information of the finder.

In at least one embodiment, the administration server 300 receives a notice from the owner that the phone number of the electronic device 100 was lost, and the administration server 300 recovers the phone number of the electronic device 100. For example, the phone number may be used in a new SIM card. After the phone number is recovered, because the ICCID of the SIM card is linked with the phone number, the administration server 300 records the notice that the phone number was lost and links a backup phone number to the ICCID. The backup phone number may be used to aid in recovery of the electronic device 100.

After the receiving module 241 receives the identification information of the electronic device 100, the searching module 242 searches the administration server 300 to determine whether the phone number has been recovered. If the phone number has been recovered, the controlling module 243 sends the personal information of the finder to the phone number to inform the owner to collect the electronic device 100 from the finder. If the phone number has not been recovered, the searching module 242 searches the administration server 300 to determine whether there exists a backup phone number linked to the identification information. If there exists a backup phone number, the controlling module 243 sends the personal information of the finder to the backup phone number to inform the owner of the electronic device 100 to collect the electronic device 100 from the finder.

In at least one embodiment, the lost-and-found tracking device 200 is in further communication with a delivery service 400. If the searching module 242 determines that there is no backup phone number linked to the identification information and there is no way to contact the owner, the searching module 242 searches the administration server 300 for the location where the SIM card was established. The controlling module 243 sends a message to the delivery service 400 to collect the electronic device 100 from the finder and send the electronic device 100 to the location. The administration server 300 makes a note that the electronic device 100 has been delivered to the location. Thus, if the owner goes to any location to establish a new SIM card, the owner can be informed that the electronic device 100 has been returned to the location.

Figure 7:
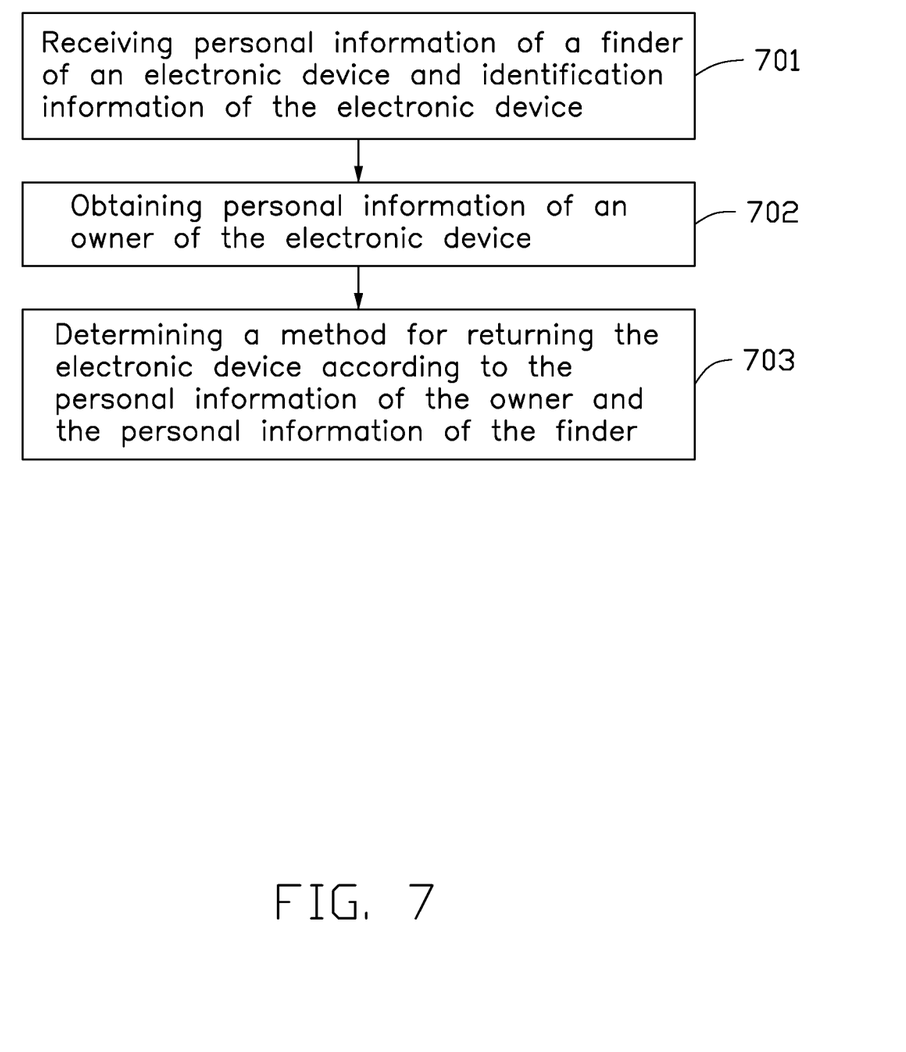
FIGS. 7 and 8 are a flowchart of a method for retrieving a lost electronic device.
Figure 8:
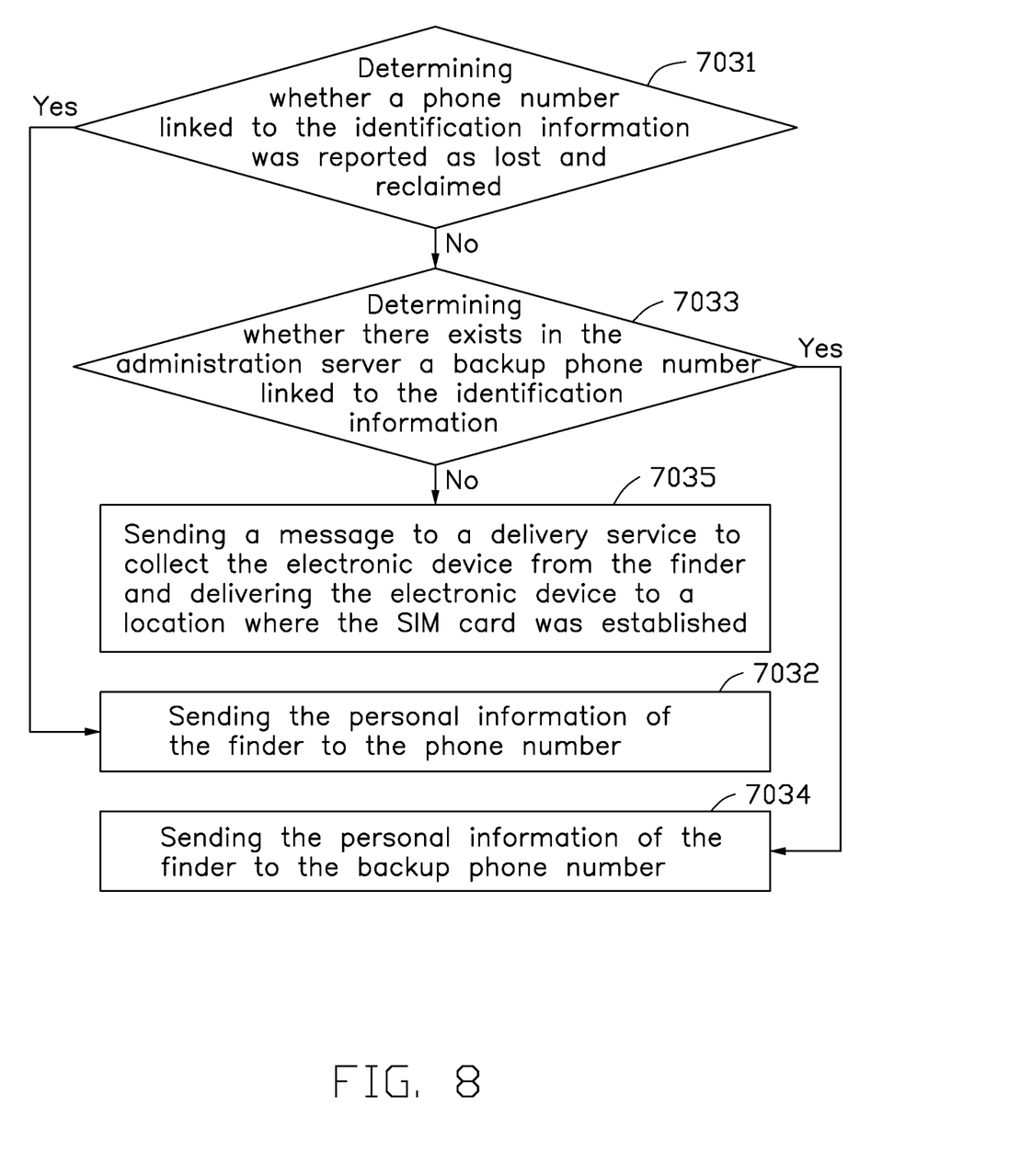

FIGS. 7 and 8 illustrate a flowchart of an exemplary method for retrieving a lost electronic device. The example method is provided by way of example, as there are a variety of ways to carry out the method. The method described below can be carried out using the configurations illustrated in FIGS. 1-6, for example, and various elements of these figures are referenced in explaining the example method. Each block shown in FIG. 7 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block 701.

At block 701, personal information of a finder of an electronic device and identification information of the electronic device is received. For example, when the electronic device is in a lock-screen state, a display screen of the electronic device may display an icon on the lock-screen. When the icon is pressed, the display screen displays a lost-and-found interface. The lost-and-found interface may include a plurality of input fields to allow the finder to input a name, telephone number, address, or other personal information. The identification information of the electronic device 100 is installed in an integrate circuit card identity (ICCID) of the SIM card, and a SIM card number and the ICCID are the identification information of the SIM card. Each ICCID is linked to a corresponding phone number.

At block 702, personal information of an owner of the electronic device is obtained from an administration server according to the identification information of the electronic device.

At block 703, a method for returning the electronic device is determined according to the personal information of the owner and the personal information of the finder.

At block 7031, whether the phone number linked to the identification information was reported as lost and reclaimed is determined. If the phone number was reclaimed, block 7032 is implemented. If the phone number has not been reclaimed, block 7033 is implemented.

At block 7032, the personal information of the finder is sent to the phone number.

At block 7033, whether there exists in the administration server a backup phone number linked to the identification information is determined. If there exists a backup phone number, block 7034 is implemented. If there does not exist a backup phone number, block 7035 is implemented.

At block 7034, the personal information of the finder is sent to the backup phone number.

At block 7035, a message is sent to a delivery service to collect the electronic device from the finder, the electronic device is delivered to a location where the SIM card was established, and completion of delivery of the electronic device to the location is noted.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An electronic device comprising:
    a display screen configured to display a lost-and-found interface when the display screen is in a lock-screen state, to allow a finder to attempt to locate the owner by inputting personal information into the interface;
    a communication unit configured to establish communication;
    a processor; and
    a storage configured to store identification information of the electronic device and a plurality of instructions, which when executed by the processor, cause the processor to:
        control the display screen to display the lost-and-found interface when the display screen is in the lock-screen state;
        obtain the personal information input by the finder, and further obtain the identification information of the electronic device;
        send, through the communication unit, the personal information input by the finder and the identification information of the electronic device to a lost-and-found tracking device in communication with the electronic device, wherein the lost-and-found tracking device obtains personal information of an owner of the electronic device according to the identification information of the electronic device and determines a method for returning the electronic device to the owner according to the personal information of the finder and the personal information of the owner;
wherein the method for returning the electronic device to the owner according to the personal information of the finder and the personal information of the owner is determined by:
determining, by an administration server, whether a phone number linked to the identification information was reported as lost and reclaimed;
sending the personal information of the finder, when the phone number has been reclaimed, to the reclaimed phone number and notifying the owner of the electronic device to collect the electronic device from the finder according to the personal information of the finder;
determining, when the phone number linked to the identification information has not been reclaimed, whether there exists in the administration server preset backup contact information linked to the identification information;
sending the personal information of the finder, when there exists preset backup contact information, according to the backup contact information to inform the owner of the electronic device to collect the electronic device from the finder according to the personal information of the finder;
searching an administrative address of a SIM card in the administration server, when there doesn't exist the preset backup contact information, sending a message to a delivery service to collect the electronic device from the finder, delivering the electronic device to the administrative address of the SIM card, and noting that the electronic device has been delivered to the administrative address of the SIM card.

2. The electronic device of claim 1 having installed therein the SIM card; the identification information of the electronic device is a unique identification number of the SIM card.

3. The electronic device of claim 1, wherein the lost-and-found interface comprises at least one input field for entering the personal information of the finder.

4. A method for retrieving a lost electronic device, the method comprising:
receiving, from the electronic device, personal information of a finder and identification information of the electronic device;
obtaining, according to the identification information of the electronic device, personal information of an owner of the electronic device; and
determining, according to the personal information of the finder and the personal information of the owner, a method for returning the electronic device to the owner;
wherein the method for returning the electronic device to the owner comprises:
determining, by an administration server, whether a phone number linked to the identification information was reported as lost and reclaimed;
sending the personal information of the finder, when the phone number has been reclaimed, to the reclaimed phone number and notifying the owner of the electronic device to collect the electronic device from the finder according to the personal information of the finder;
determining, when the phone number linked to the identification information has not been reclaimed, whether there exists in the administration server preset backup contact information linked to the identification information;
sending the personal information of the finder, when there exists preset backup contact information, according to the backup contact information to inform the owner of the electronic device to collect the electronic device from the finder according to the personal information of the finder;
searching an administrative address of a SIM card in the administration server, when there doesn't exist the preset backup contact information, sending a message to a delivery service to collect the electronic device from the finder, delivering the electronic device to the administrative address of the SIM card, and noting that the electronic device has been delivered to the administrative address of the SIM card.

5. The method of claim 4, wherein the electronic device has installed therein the SIM card; the identification information of the electronic device is a unique identification number of the SIM card.

6. The method of claim 5, wherein the personal information of the owner is obtained corresponding to the identification information of the electronic device from the administration server.

7. The method of claim 4, wherein the personal information of the finder is input into a lost-and-found interface displayed by the electronic device when the electronic device is in a lock-screen state.

8. A lost-and-found tracking device comprising:
a communication unit configured to establish communication;
a processor; and
a storage configured to store a plurality of instructions, which when executed by the processor, cause the processor to:
retrieve, through the communication unit, personal information of a finder of an electronic device and further receive identification information of the electronic device;
obtain, according to the identification information of the electronic device, personal information of an owner of the electronic device; and
determine, according to the personal information of the owner of the electronic device, a method for returning the electronic device to the owner;
wherein the method for returning the electronic device to the owner according to the personal information of the owner and the personal information of the finder is determined by:
determining, by an administration server, whether a phone number linked to the identification information was reported as lost and reclaimed;
sending the personal information of the finder, when the phone number has been reclaimed, to the reclaimed phone number and notifying the owner of the electronic device to collect the electronic device from the finder according to the personal information of the finder;
determining, when the phone number linked to the identification information has not been reclaimed, whether there exists in the administration server preset backup contact information linked to the identification information;
sending the personal information of the finder, when there exists preset backup contact information, according to the backup contact information to inform the owner of the electronic device to collect the electronic device from the finder according to the personal information of the finder;

searching an administrative address of a SIM card in the administration server, when there doesn't exist the preset backup contact information, sending a message to a delivery service to collect the electronic device from the finder, delivering the electronic device to the administrative address of the SIM card, and noting that the electronic device has been delivered to the administrative address of the SIM card.

9. The lost-and-found tracking device of claim 8, wherein the electronic device has installed therein the SIM card; the identification information of the electronic device is a unique identification number of the SIM card.

10. The lost-and-found tracking device of claim 9, wherein the personal information of the owner is obtained corresponding to the identification information of the electronic device from the administration server.

* * * * *